May 1, 1923.
C. F. H. SPIEGEL
HEATER FOR WATER TANKS
Filed Oct. 4, 1922
1,453,481
2 Sheets-Sheet 1
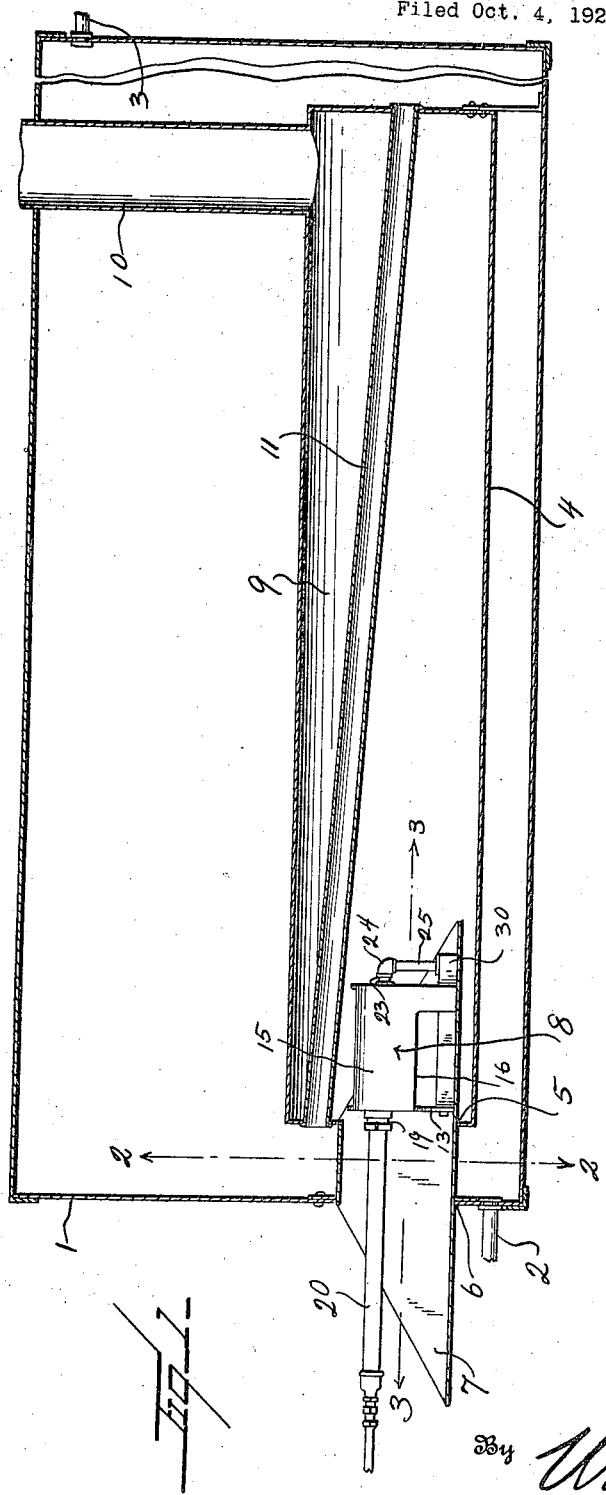
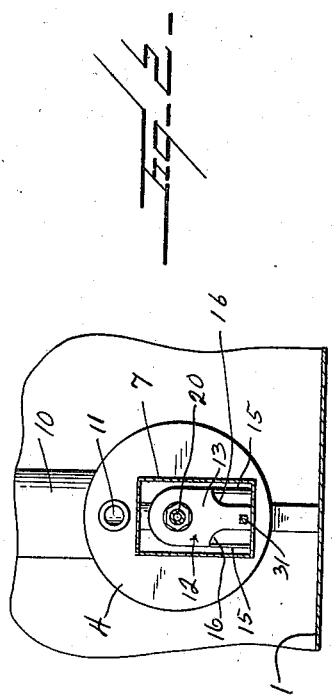
Inventor
C.F.H. Spiegel
By Watson E. Coleman
Attorney

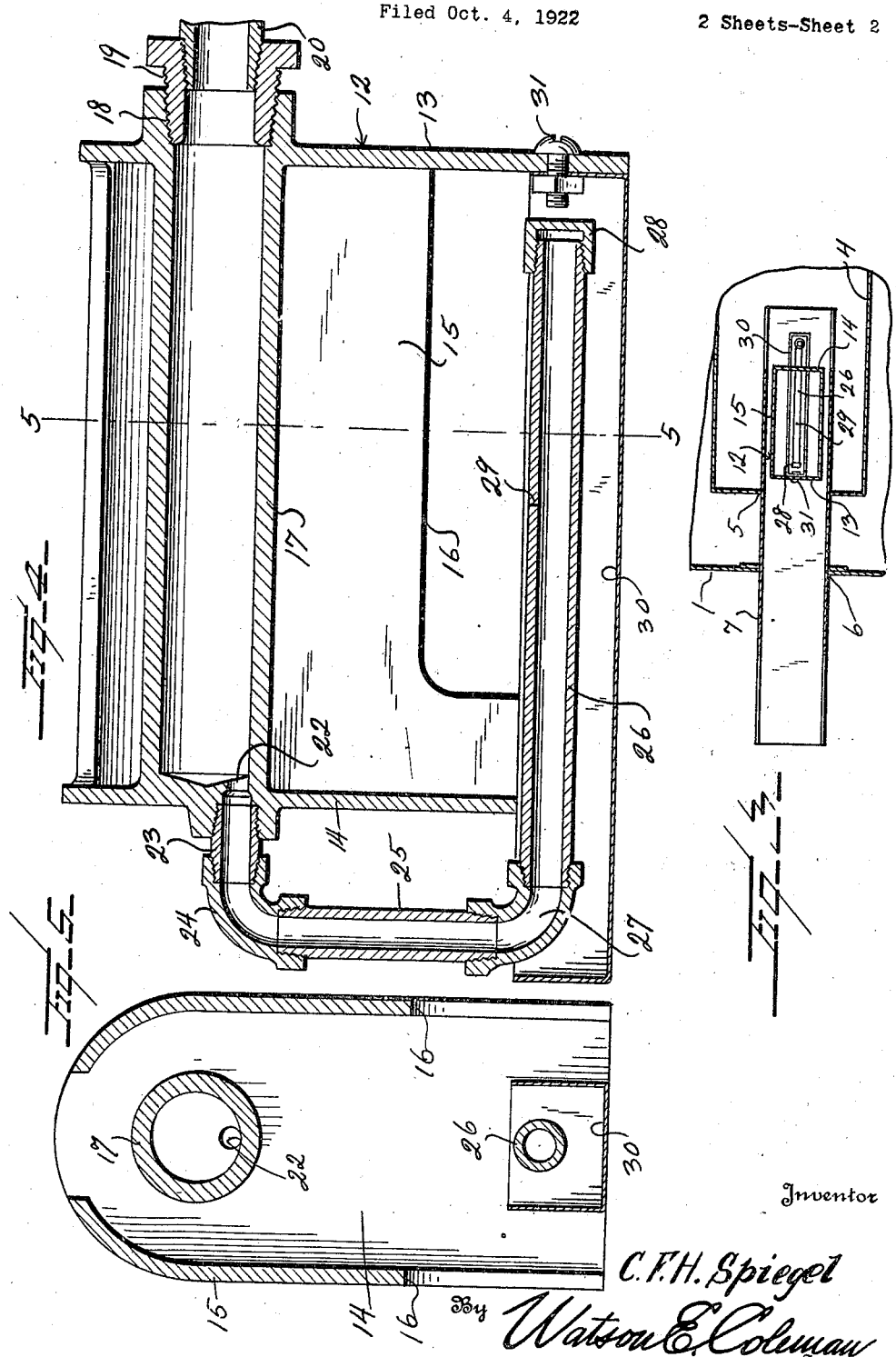

Patented May 1, 1923.

1,453,481

UNITED STATES PATENT OFFICE.

CHRIS F. H. SPIEGEL, OF HAMBURG, IOWA.

HEATER FOR WATER TANKS.

Application filed October 4, 1922. Serial No. 592,372.

*To all whom it may concern:*

Be it known that I, CHRIS F. H. SPIEGEL, a citizen of the United States, residing at Hamburg, in the county of Fremont and State of Iowa, have invented certain new and useful Improvements in Heaters for Water Tanks, of which the following is a specification, reference being had to the accompanying drawings.

In order to keep water for stock watering troughs from freezing or getting too cold, the present invention has for its purpose the provision of a heater or burner, for heating the water, which surrounds tubes in a tank, the burner being removably insertible through an opening in the tank and arranged on a support for the purpose of sending heat around the tubes in the tank in a manner similar to that derived from a blow torch, for keeping the water thoroughly heated.

Another purpose is the provision of a tank for the reception of water to be heated including an inner heat chamber, through which water tubes pass, there being an opening through the wall of the tank communicating with the heat chamber and including a support projecting into the heat chamber, whereby the burner may be arranged in one end of the heat chamber for the purpose of supplying heat to the water tubes, there being means through the wall of the tank and communicating with the heat chamber for carrying off the products of combustion from the burner.

Still another purpose is the provision of a burner comprising a casing with a burner pan in the bottom thereof, also including a burner tube extending into the pan and spaced from the bottom of the pan, so as to be heated from a supply of oil or fuel which is deposited in the pan and lighted. Obviously when the kerosene or gasoline is allowed to enter the burner tube, it becomes heated and lighted as it escapes from an infinitesimal orifice in the burner tube, thereby affording a blaze similar to that derived from a blow torch, which will thoroughly heat the water in the water tubes. As the fuel escapes from said orifice in the burner tube, it becomes volatilized and vaporized, owing to the air being drawn through the opening leading through the wall of the tank into the heat chamber.

A further purpose is the provision of a burner, wherein a portion of the fuel pipe is disposed above the burner tube, which enables the fuel to be preheated before it reaches the burner tube.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a sectional view through the tank, showing the heat chamber with the water tubes therein, and illustrating the burner as applied;

Figure 2 is a sectional view on line 2—2 of Figure 1;

Figure 3 is a sectional view on line 3—3 of Figure 1;

Figure 4 is an enlarged detail longitudinal sectional view through the burner;

Figure 5 is a vertical sectional view on line 5—5 of Figure 4.

Referring to the drawings, 1 designates a water heating tank, which is supplied with water from any suitable source (not shown), through the medium of the inlet pipe 2. This tank may be connected by means of a pipe 3, with a stock watering trough (not shown), for the purpose of supplying heated water thereto.

The tank 1 has mounted on the interior thereof a casing 4 provided with an opening 5 at one end, which registers with an opening 6 in one end wall of the tank 1, there being a suitable trough or burner support 7 passing through the registering openings 5 and 6, and secured in place in any suitable manner so as to prevent leakage of the water, and which is adapted to support a burner 8, for supplying heat to the heat chamber 9 of the casing 4.

The casing 4 has a vertically disposed outlet pipe 10 for the purpose of carrying off the products of combustion from the heat chamber 9. Arranged in the heat chamber 9 upon inclinations and connected to the end walls of the casing 4 is a water tube 11, through which the water in the tank 1 circulates, for the purpose of being heated through the medium of the burner 8. The water passes through the lower end of the tube 11 and passes out through its raised end.

The support 7 is U-shaped, and is constructed and arranged so as to permit the burner 8 to be inserted and removed for the purpose of supplying heat to the tubes 11.

The burner comprises the casing 12 in the form of a casting, said casing comprising end walls 13 and 14 and the side walls 15. The lower portions of the side walls are cut away as shown at 16, and obviously, at one end of the casing, these cut away portions 16 extend into the end wall 13 of the casing. The upper portions of the end walls 13 and 14 are connected by means of a tubular chamber 17, into which the fuel first enters, as it is being supplied to the burner. One end of this chamber 17 has a relatively large opening 18, at least a trifle larger than the diameter of the chamber 17, and threaded into said opening is a nipple 19, into which the fuel supply pipe 20 is threaded, thereby making a connection with the burner, for the purpose of supplying fuel thereto. This pipe 20 may connect with any suitable source of fuel supply, whereby fuel may be conveyed to the burner. The supply of fuel through the pipe 20 may be controlled by means of a suitable needle valve (not shown) which permits the fuel to enter the pipe in a relatively steady small stream, so that the chamber 17 will not become over-supplied.

The other end of the chamber 17 has an outlet or discharge opening 22, which is disposed adjacent to and on the level with the bottom of the chamber 17, so that the fuel will readily pass out through the pipe 23, without having to rise to a level which would permit the fuel to pass out, provided the pipe should be connected to the chamber axially concentrically therewith. The pipe 23 is threaded into the end wall 14, and is in turn connected to an elbow 24, to which a pipe section 25 is connected. The pipe section 25 is connected to the burner tube 26 by means of an elbow 27. The burner tube 26 is disposed below the burner chamber 17 and parallel therewith and has a cap 28 for the purpose of closing its terminal. The burner tube 26 is provided with an infinitesimal orifice or opening 29, which is located at a point substantially midway the casing 12, that is to say substantially midway the end walls 13 and 14 of the casing, so that the blaze from the burner, similar to that derived from a blow torch, is directed upwardly against the center portion of the burner chamber 17.

A suitable burner pan 30 is arranged below the burner tube, and is fastened at one end by means of a bolt 31 to the end wall 13 of the casing 12, thereby supporting the burner pan in position. This burner pan is U-shaped in cross section, and is therefore of such a construction as to permit the burner tube to extend thereinto, and parallel with the bottom thereof.

In the operation, the fuel, such as gasoline or kerosene, sufficient to supply heat to the burner tube, is first placed in the burner pan 30. This supply of gasoline or kerosene is lighted, therefore heating the burner tube, as well as the burner chamber 17. After these parts have been heated sufficiently, the supply of gasoline or kerosene is turned on by manipulating and regulating a needle valve (not shown). The fuel enters the burner chamber, where it is preheated, due to the heat from below, and then passes out through the connection with the burner tube 26, which is below the burner chamber. As previously stated the burner tube is located in the burner pan, and is but a short distance from its bottom. The fuel discharges from the infinitesimal orifice 29, and when lighted, the blaze thereof is similar to that derived from a blow torch. The discharge of preheated fuel, which is subsequently heated by the heat from the burner tube, from the orifice 29 is lighted from the blaze arising from the burner pan, and remains lighted as long as the fuel is supplied to the burner tube through the medium of the burner chamber, even though the fuel in the burner pan may be consumed.

This flame from the orifice 29 in the form of a blow torch circulates around the burner chamber, and around the water tubes 11, thereby thoroughly heating the water therein, as well as heating the water in the tank 1. The products of combustion from the burner pass off through the pipe 10. Obviously the burner may be inserted and removed at will, and may be disposed in different positions on the support 7, and since the support 7 is provided with water-tight joints with one of the end walls of the tank 1 and one of the end walls of the heat chamber 4, leakage of the water in the tank 1 is prevented.

The invention having been set forth, what is claimed is:

In a heating device, a water tank, a heat casing disposed within the tank, one end of said casing being supported in spaced relation to the bottom of the tank by a bracket, the opposite end of the casing having an opening registering with an opening in the adjacent wall of the tank, a substantially U-shaped burner support disposed in the registering openings of the tank and casing, said support having the upper portion of each end thereof cut away, and one of said end portions of the support extending into the casing, the opposite end portion of the support extending outwardly of the casing to provide an air conduit, and burner means supported by the inner end portion of the support.

In testimony whereof I hereunto affix my signature.

CHRIS F. H. SPIEGEL.